June 19, 1956 F. H. CHASE 2,751,545

TRANSISTOR CIRCUITS

Filed March 10, 1953 3 Sheets-Sheet 1

INVENTOR
F. H. CHASE
BY
G. F. Heuerman
ATTORNEY

INVENTOR
F. H. CHASE
BY G. J. Heuerman
ATTORNEY

INVENTOR
F. H. CHASE
BY
G. J. Heuerman
ATTORNEY

United States Patent Office 2,751,545

Patented June 19, 1956

2,751,545

TRANSISTOR CIRCUITS

Fay H. Chase, Short Hills, N. J., assignor to Bell Telephone Laboratories, Incorporated, New York, N. Y., a corporation of New York Application March 10, 1953, Serial No. 341,519

17 Claims. (Cl. 321—18)

Figure 1:
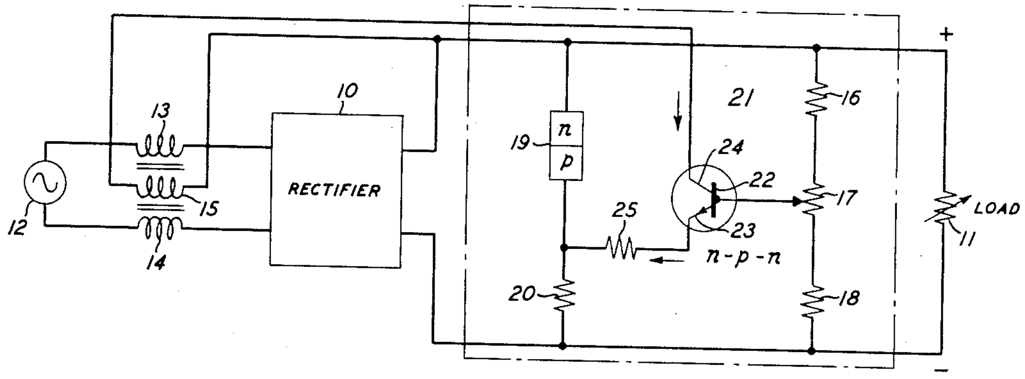

This invention relates to transistor circuits and more particularly to transistor controlled saturable reactor regulated rectifiers.

An object of the invention is to provide improved circuits including one or more transistors for regulating the supply of current from a current source to a load.

Another object is to provide a multistage transistor circuit in which the interstage coupling loss is minimized.

In a junction transistor there are two rectifiers contained in a bar cut from a single crystal of transistor material. The materials now in use are germanium and silicon, but to date almost all transistors have been made from germanium. The two rectifiers are obtained by introducing two kinds of impurities in the material from which the crystal is grown. When an impurity from the third column of the chemical periodic table is added, the material becomes a conductor of positive charges and it is therefore called p-type material. When the impurity comes from the fifth column of the table, the material is a conductor of negative charges and it is therefore called n-type material. If one-half of the material is grown from p-type material, and the other half from n-type material, there is formed a p-n junction. This junction is a rectifier because it is a good conductor of current from p toward n but only a minute current can flow from n toward p. Thus the junction, like any rectifier, has a low forward resistance and a high inverse resistance. If the crystal is grown so that there is a wafer of p-type material interposed between two sections of n-type material, there is produced an n-p-n type transistor. If there is a wafer of n-type material, between two sections of p-type material, there is formed a p-n-p type transistor. The electrical connections to the end portions of a transistor crystal are called the collector at one end and the emitter at the other end. The connection to the wafer is called the base. The n-p-n transistor operates with a collector potential which is positive with respect to the emitter potential so that current flows through the collector-base junction in the inverse or high resistance direction and through the emitter-base junction in the forward or low resistance direction. The p-n-p transistor operates with a collector potential which is negative with respect to the emitter potential so that current again flows through the collector-base junction in the inverse or high resistance direction and through the emitter-base junction in the forward or low resistance direction. Both types of transistors will amplify changes of current flow into or out of the base into much larger changes of current in a current path connected to the collector.

There is a third kind of transistor known as a point contact transistor. It comprises two closely spaced points of metal in contact with a crystal of transistor material which may be either the n- or p-type. In a point contact transistor also, two rectifying junctions are formed, one between the transistor material and one of the metallic points and the other between the transistor material and the other metallic point. In operation, current flows through the collector rectifier in its inverse or high resistance direction and through the emitter rectifier in its forward or low resistance direction. This transistor operates with a negative potential applied to the collector with respect to the potential of the emitter and, because it operates similarly to a p-n-p junction transistor, it may be said to be a transistor of the p-n-p type. Further descriptive material relating to transistors and their characteristics and applications may be found in "The Transistor," copyrighted in 1951 by Bell Telephone Laboratories Incorporated.

In circuit arrangements shown and described herein for the purpose of illustration, there is provided a rectifier for rectifying current from an alternating-current supply source and for supplying the rectified current to a load. For controlling the alternating-current supplied to the rectifier and therefore, the output voltage of the rectifier which is impressed upon the load circuit, there is provided a saturable reactor having an impedance or power winding or windings in a current through which current from the alternating-current supply source is supplied to the rectifier, the impedance of the impedance winding or windings being controlled in response to direct-current supplied to a saturating or control winding of the reactor. A circuit comprising one or more transistors is provided for controlling the current supplied to the saturating winding of the saturable reactor in response to load voltage changes so as to minimize variations of load voltage.

A circuit comprising a single transistor for controlling the saturable reactor may be capable of regulating with suitable precision load currents of relatively small magnitude. This limitation may be overcome, for example, by utilizing the transistor circuit for controlling a magnetic amplifier of one or more stages and utilizing the magnetic amplifier in turn, to control the saturable reactor. With such an arrangement there may be obtained a regulating current of the magnitude required in the saturating windings of the saturable reactors used to control the output of a relatively high power regulated rectifier. It would appear to be preferable, however, to employ a multistage transistor circuit for controlling the current in the saturating winding of the saturable reactor to avoid the lag in the response of the magnetic amplifiers. It seems likely, moreover, that such an arrangement would cost less than the one employing a magnetic amplifier.

When a control circuit comprising a plurality of transistor stages is provided, it is preferable to employ, in a portion at least of the control circuit, different types of transistors in successive stages, the one transistor being of a type requiring for operation a collector potential which is positive with respect to the emitter potential and the other transistor being of a type requiring for operation an emitter potential which is positive with respect to the potential of its collector. The transistors are connected so that current flowing through the collector-base junction of one type of transistor also flows through the emitter-base junction of the other type of transistor. For example, where a p-n-p transistor is used in a first stage and an n-p-n transistor is used in a second stage, the collector of the p-n-p transistor and the base of the n-p-n transistor are conductively connected so that current flowing through the collector-base junction of the p-n-p transistor flows through the emitter-base junction of the n-p-n transistor. The characteristic collector resistance $r_c$ of a transistor is very high while its characteristic base resistance $r_b$ and its characteristic emitter resistance $r_e$ are very low. In a so called grounded base or grounded emitter transistor stage, the characteristic input resistance is the sum of $r_e$ and $r_b$ which is also very low with respect to the collector resistance $r_c$. The characteristic resistances of transistors are discussed in a chapter by Wallace and Pietenpol in the publication "The Transistor," supra. When the collector of one transistor is connected in series with the emitter and base of another transistor, the collector current of the first transistor is reduced only minutely by the added resistance of the second transistor. This results in a negligible coupling loss in the transistor stages and full current gain of the second transistor is available. More than two transistor stages may be employed. For example, the first and third stages may comprise n-p-n transistors and a p-n-p transistor may be used in the second stage, the collector of the first stage being conductively connected to the base of the second stage and the collector of the second stage being conductively connected to the base of the third stage. Then the collector current of the first stage will flow through the emitter-base path of the second stage and the collector current of the second stage will flow through the emitter-base path of the third stage.

Figure 2:
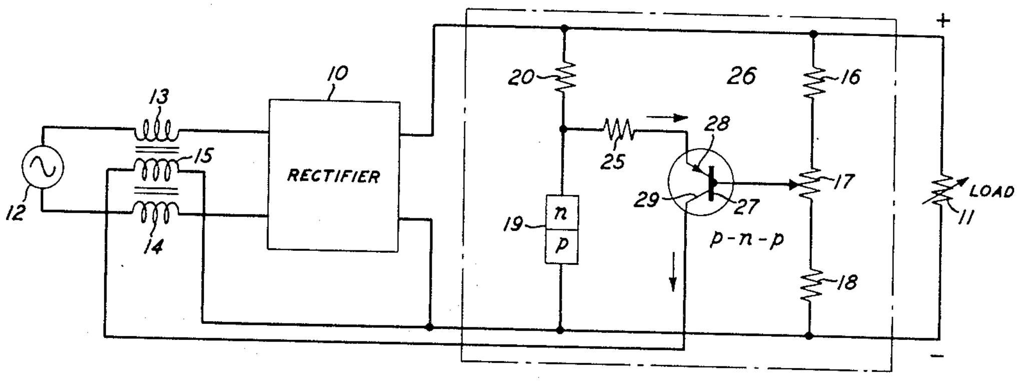
Figure 3:
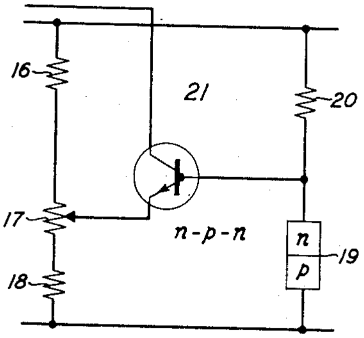
Figure 4:
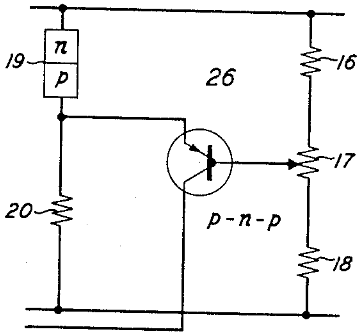

Figs. 1, 2 and 5 to 10 inclusive of the accompanying drawing are schematic views of transistor circuits for controlling the supply of current from a current source to a load to minimize load voltage changes in accordance with the invention; and Figs. 3 and 4 are modifications of portions of Figs. 1 and 2, respectively.

Referring to the drawing there is provided in Fig. 1 a rectifier 10 for supplying direct current to a load circuit including a load 11 which may be varied. The rectifier includes a suitable filter, not shown, for suppressing alternating components. Current is supplied to the rectifier from an alternating-current supply source 12 through impedance windings 13 and 14 of a saturable reactor which also has a saturating winding 15 for controlling the impedance of windings 13 and 14 in response to direct current supplied to winding 15. Preferably in each of the embodiments of the invention, the windings 13, 14 and 15 are wound on the core so that the direct magnetomotive force set up in the core due to current supplied to winding 15 aids the direct magnetomotive forces set up due to rectified currents supplied from source 12 through windings 13 and 14, respectively. If desired, however, an input transformer may be used in rectifier 10 in which case alternating current from source 12 flows through windings 13 and 14. Two shunt current paths connected across the load are provided, the one path comprising a resistor 16, potentiometer 17 and a resistor 18, all in series, and the other path comprising in series, a Zener diode 19 and a resistor 20. A Zener diode is a p-n junction rectifier poled so that current flows through it in the inverse or high resistance direction. The magnitude of the current is made sufficiently large to exceed the so called Zener point so that the voltage drop across the diode will remain substantially constant irrespective of variations of the current flowing through it. The Zener diode is used as a constant voltage device because it can be made for the relatively low values of voltage usually required in transistor circuits while cold cathode, gas-filled tubes require relatively higher voltages. Zener diodes and their characteristics are disclosed in an application of W. Shockley, Serial No. 211,212, filed February 16, 1951, now Patent No. 2,714,702, August 2, 1955.

There is provided a transistor 21 of the n-p-n type having a base 22 connected to the variable tap of potentiometer 17, an emitter 23 connected through a resistor 25, which in some cases may be omitted, to a common terminal of the diode 19 and resistor 20 and a collector 24 connected to one terminal of saturating winding 15 the other terminal of which is connected to the positive load terminal. The arrow head on the line representing the emitter shows that the current flows out of the emitter and, therefore, that the transistor is of the n-p-n type.

Neglecting, for the time being, the voltage drop across resistor 25, it is seen that there is impressed between the base and the emitter a voltage equal to the algebraic sum of the constant voltage across the diode 19 and a voltage across resistor 16 and a portion of potentiometer 17 which varies in accordance with load voltage changes.

The potentiometer 17 is usually adjusted so that the base potential is positive with respect to the potential of the emitter but in some cases it may be adjusted so that the base is negative with respect to the emitter. When the base is positive with respect to the emitter, current flows from the positive load terminal through resistor 16 and a portion of potentiometer 17, from the base to the emitter and thence through resistors 25 and 20 to the negative load terminal. When the base is negative with respect to the emitter potential, current flows from the positive load terminal through winding 15, from the collector to the base and through a portion of potentiometer 17 and resistor 18 to the negative load terminal. The current flowing into or out of the base is the algebraic sum of the current flowing into the collector and the current flowing out of the emitter. The transistor 21 amplifies changes of the base current into changes of current flowing into the collector. When the base is positive with respect to the emitter, current flows from the positive load terminal, through winding 15 into the collector, out of the emitter and through the resistors 25 and 20 to the negative load terminal, and when the base is negative with respect to the emitter, some of the current flowing into the collector also flows out of the base and through a portion of potentiometer 17 and through resistor 18 to the negative load terminal.

If the load voltage should increase, for example, the base of transistor 21 would become relatively less positive or more negative with respect to the emitter to cause a decrease of current flowing into the base or an increase of current flowing out of the base. The current flowing through the reactor winding 15 into the collector is thus decreased. The impedance of reactor windings 13 and 14 is therefore increased to cause a reduction of the voltage across the load circuit connected to the rectifier output, thereby minimizing the initially assumed increase of load voltage.

As previously stated, the circuit of Fig. 1 may be operated without the resistor 25 in the path connecting the emitter 23 to the common terminal of the diode 19 and resistor 20. With the resistor 25 in the circuit, however, degenerative stabilization is obtained which will reduce manufacturing and ambient temperature variations in current gain of the transistor at the expense of reduction in gain of the transistor circuit. With the circuit as shown, when there is an increase of current flowing into the collector and out of the emitter, the base of the transistor is made relatively more negative with respect to the emitter, thereby reducing the current flowing into the collector. The circuit is thus made less dependent upon the gain of the transistor and more dependent upon the loss in the feedback circuit through the resistor 25.

Fig. 2 is a modification of Fig. 1. In Fig. 2, and also in subsequent figures, elements corresponding to elements of Fig. 1 are designated by the same numerals. In Fig. 2 there is employed, in place of the n-p-n transistor of Fig. 1, a p-n-p type transistor 26 having a base 27, an emitter 28 and a collector 29. The arrow head on the line representing the emitter shows that the current flows into the emitter and, therefore, that the transistor is of the p-n-p type. The positions of the diode 19 and resistor 20 are reversed in Fig. 2 with respect to their positions in Fig. 1 and the collector 29 is connected through winding 15 to the negative load terminal. The potentiometer 17 is usually adjusted so that the base potential is negative with respect to the emitter potential but in some cases it may be adjusted so that the base is positive with respect to the emitter. The transistor amplifies changes of the base current into much larger changes of current flowing out of the collector. If the load voltage should increase, for example, the base of the transistor would become relatively more positive or less negative with respect to the emitter to cause a decrease of current flowing out of the base or an increase of current flowing into the base. This would cause a decrease of current flowing out of the collector and through the saturating winding 15. The resulting increase of the impedance of windings 13 and 14 of the reactor will cause a reduction of the voltage across the load circuit connected to the rectified output, thus minimizing the initially assumed increase of load voltage.

Fig. 3 is a modification of the portion of Fig. 1 enclosed by the dash dot line. As previously stated, the resistor 25 of Fig. 1 can be omitted if desired and the emitter 23 connected to one terminal of the diode 19 the other terminal of which is connected to the positive load terminal. Thus the emitter is at a substantially fixed potential with respect to a terminal of the load to which the base is connected through a portion of potentiometer 17 and resistor 16. Such an amplifier stage is sometimes called a grounded emitter stage. Fig. 3 shows an equivalent stage which is sometimes called a grounded base stage since the base is connected through the constant voltage device 19 to one terminal of the load, the emitter being connected to said load terminal through resistor 18 and a portion of potentiometer 17 and the collector being connected to the other load terminal through the reactor winding 15.

Fig. 4 is a modification of the portion of Fig. 2 enclosed by the dash dot lines. Fig. 4 is a grounded emitter stage, the emitter being connected through the constant voltage diode 19 to the positive terminal of the load to which the base is connected through resistor 16 and a portion of potentiometer 17. The collector is connected through the winding 15 to the negative load terminal. This modification is useful when the saturable reactor 13, 14, 15 is constructed so that increasing the current in winding 15 will increase the impedance of windings 13 and 14. A similar modification of Fig. 1 can be made so that the n-p-n transistor circuit will operate with this type of saturable reactor.

Figure 5:
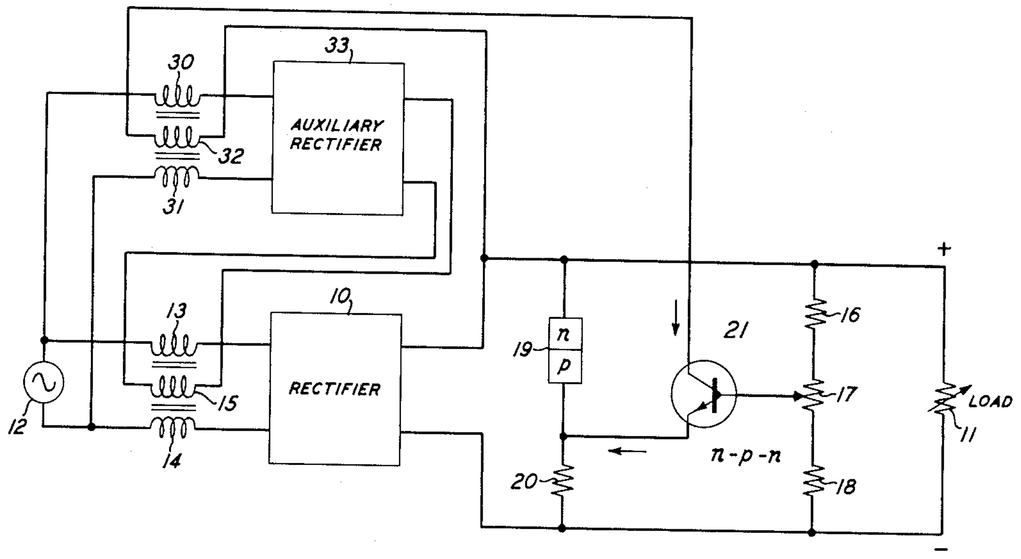

Fig. 5 is a modification of Fig. 1 in which a magnetic amplifier is employed for amplifying the collector current of transistor 21, the amplified current being supplied to the saturating winding of the saturable reactor 15. Several stages of magnetic amplification may be employed if desired to make possible the regulation of larger output currents. The magnetic amplifier comprises an auxiliary rectifier 33 including a suitable filter, not shown, to which rectifier current is supplied from source 12 through windings 30, 31 of a saturable reactor which has a saturating winding 32 for controlling the impedance of windings 30 and 31 in response to direct current supplied to winding 32. The auxiliary rectifier 33 supplies current to the saturating winding 15 of saturable reactor 13, 14, 15. The saturating winding 32 is in a current path connecting the collector of transistor 21 to the positive load terminal so that changes of collector current produces impedance changes of winding 30 and 31 to control the current supplied to winding 15. The magnetic amplifier thus amplifies the collector current of transistor 21 to increase the change of impedance of windings 13 and 14 which is produced in response to a predetermined load voltage change.

While a single stage control circuit together with a magnetic amplifier of one or more stages can be used to obtain the amount of current required in the saturating winding of a saturable reactor of a high power regulated rectifier, such an arrangement has the disadvantage that there is a considerable time delay in changing the current in the saturating winding of each magnetic amplifier stage. The time delay can be reduced by adding resistances in series with the saturating windings respectively, but such a modification will also reduce the current gain of each magnetic amplifier stage. Moreover, it appears that multistage transistor circuits will be less expensive to manufacture than multistage magnetic amplifiers.

Figure 6:
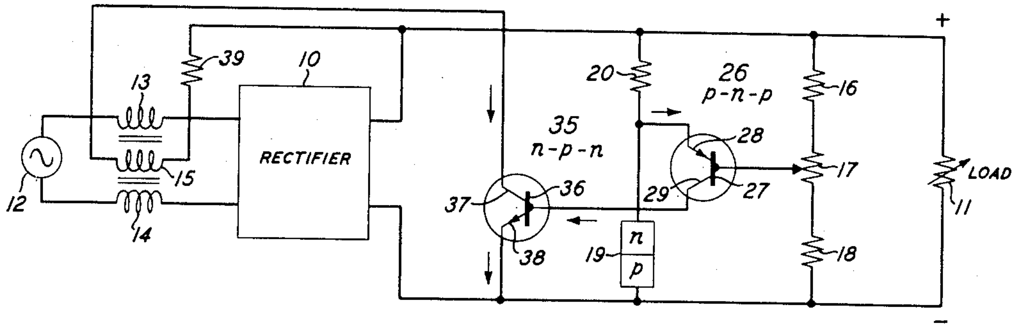

In Fig. 6 there is depicted a modification of the control circuit of Fig. 2 in which there is provided, in addition to the p-n-p transistor 26 of Fig. 2, a second transistor amplifier stage comprising an n-p-n transistor 35 having a base 36, a collector 37 and an emitter 38. The collector 29 of transistor 26 is conductively connected to the base 36 of transistor 35 and the emitter 38 of transistor 35 is connectced directly to the negative load terminal. The collector 37 of transistor 35 is connected through saturating winding 15 and a resistor 39, in series, to the positive load terminal. In this arrangement the current which flows out of the collector 29 of transistor 26 flows into the base 36 of transistor 35, thereby reducing the interstage coupling loss to a minimum since there is connected in series with the high collector resistance of transistor 26 the low input resistance of transistor 35, the collector current being reduced by only a negligible amount by the addition of the relatively low input resistance of transistor 35. If the load voltage should rise, for example, the base of transistor 26 will become relatively more positive or less negative with respect to the emitter to cause a reduction of the current flowing out of the base and a reduction of the current flowing out of the collector. Thus the current flowing into the base of transistor 35 is reduced to cause a reduction of the current flowing through saturating winding 15 into the collector of transistor 35. The impedance of reactor windings 13 and 14, therefore, is increased to minimize the assumed increase of load voltage.

Figure 7:
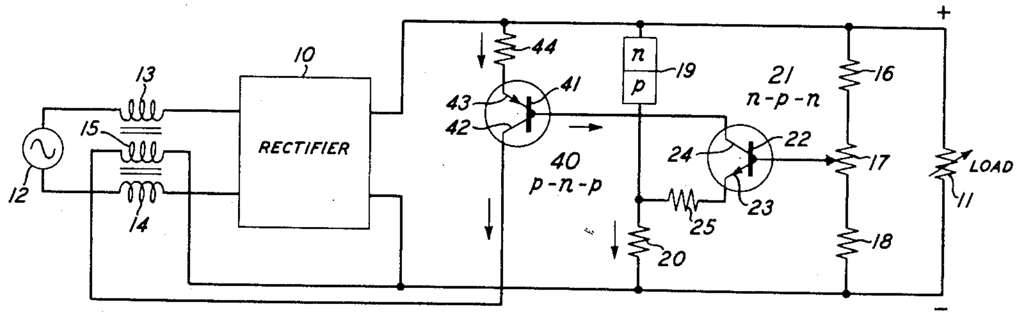

Fig. 7 is a modification of Fig. 1 in which there is provided in addition to the n-p-n transistor stage comprising transistor 21 of Fig. 1, a second transistor stage comprising a p-n-p transistor 40 having a base 41, a collector 42 and an emitter 43. The collector 24 is directly conductively connected to the base 41 of transistor 40. The positive load terminal is connected through a resistor 44 to the emitter 43 of transistor 40 and the collector 42 is connected through saturating winding 15 to the negative load terminal. The resistor 44 in the emittter current path of transistor 40 provides degenerative stabilization for this stage as the resistor 25 in the emitter current path of transistor 21 provides degenerative stabilization for the first stage. When an increase of load voltage, for example, makes the base of transistor 21 relatively more negative, the current flowing out of the base of transistor 40 and into the collector of transistor 21 is reduced, thereby reducing the current flowing out of the collector of transistor 40 and through the saturating winding 15. The resulting rise of impedance of reactor windings 13 and 14 minimizes the increase of load voltage.

Figure 8:
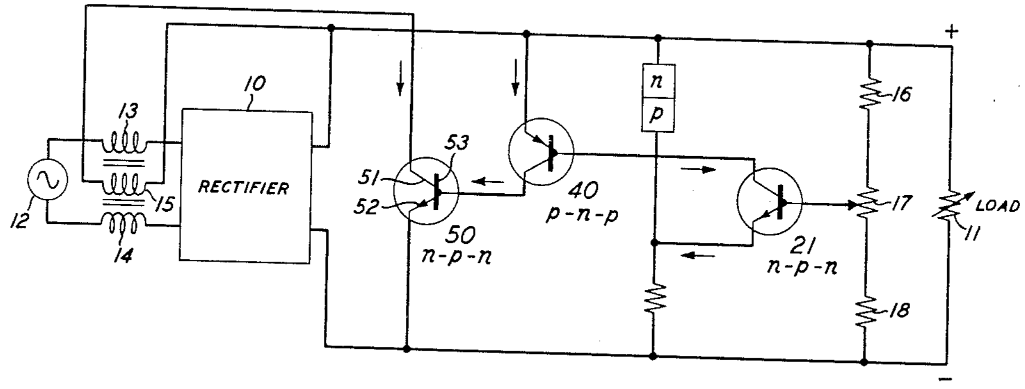

Fig. 8 is a modification of Fig. 7 in which there is added to the two-stage amplifier comprising transistors 21 and 40 of Fig. 7 a third stage comprising a transistor 50 having a collector 51, an emitter 52 and a base 53. The collector of transistor 40 is conductively connected to the base 53 of transistor 50. The emitter 52 is connected directly to the negative load terminal and the collector 51 is connected through saturating winding 15 to the positive load terminal. When the current flowing out of the collector of p-n-p transistor 40 is reduced due to an increase of load voltage, for example, this same current flowing into the base of n-p-n transistor 50 is also reduced to cause a reduction of the current flowing through saturating winding 15 and into the collector 51 of transistor 50. The assumed increase of load voltage is thus minimized.

Figure 9:
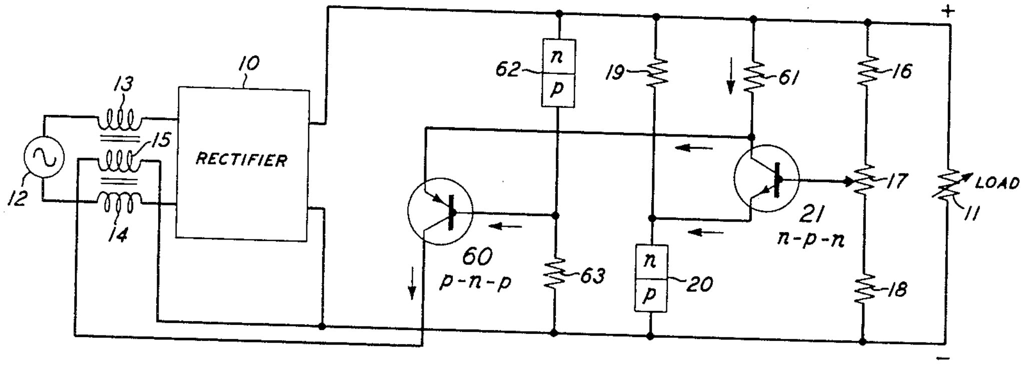

In Fig. 9 there is employed in the first stage an n-p-n junction transistor 21, as in Fig. 1, and in the second stage a transistor 60 which may be of the p-n-p point contact type. Current flowing through a resistor 61 is supplied both to the collector of transistor 21 and also the emitter of transistor 60. A Zener diode 62 and a resistor 63 in series are connected across the load circuit, a common terminal of the diode and resistor being connected to the base of transistor 60. The collector of transistor 60 is connected through the saturating winding 15 to the negative load terminal. The characteristic collector resistance of transistor 21 is large, say, of the order of 100,000 ohms.

To obtain a reasonable voltage gain in the first stage, the resistance of resistor 61 should also be large. However, the characteristic input resistance of transistor 60 is small, say of the order of 190 ohms. For reasonable current gain in the second stage, the resistance of resistor 61 should be low. In other words, there is a large coupling loss between the stages of Fig. 9 due to a large mismatch of characteristic resistances. This mismatch of characteristic resistances can be minimized by inserting an n-p-n transistor current amplifier between the stage comprising transistor 21 and the stage comprising transistor 60. Such an arrangement is shown in Fig. 10 which will now be described.

Figure 10:
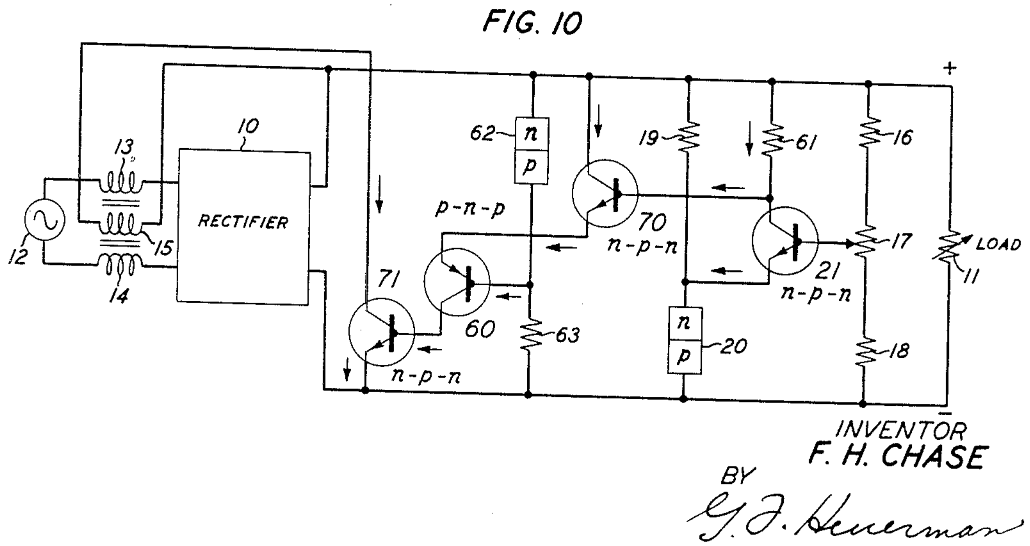

In Fig. 10 there is provided between the transistor stages 21 and 60, a grounded collector current amplifier stage comprising a transistor 70 of the n-p-n type. There is also provided an n-p-n transistor 71 between the transistor 60 and the saturating winding 15 of the saturable reactor. The collector of transistor 21 is conductively connected to the base of transistor 70. The collector of transistor 70 is connected to the positive load terminal. The emitter of transistor 70 is conductively connected to the emitter of transistor 60. The collector of transistor 60 is conductively connected to the base of transistor 71 and the emitter of transistor 71 is connected to the negative load terminal. The collector of transistor 71 is connected through the saturating winding 15 to the positive load terminal. As shown in the article by Wallace and Pietenpol in the publication "The Transistor," supra, the matched input impedance of a grounded collector stage is high, say 139,000 ohms, with respect to its matched output impedance, say, 2,990 ohms. A value of 139,000 ohms for resistor 61 will result in good voltage amplification in the stage comprising transistor 21. While the output impedance of 2,990 ohms is still high with respect to the input impedance of transistor 60, there is a considerable improvement in this arrangement over the arrangement shown in Fig. 9.

If we assume again an increase of load voltage, the base of transistor 21 will become relatively more positive to cause an increase of current flowing through resistor 61 and into the collector of transistor 21. This will have the effect of reducing the current flowing into the base of transistor 70 and thus reducing the current flowing out of the emitter of transistor 70 and into the emitter of transistor 60. The current flowing into the base of transistor 60 is thus increased and the current flowing out of the collector of transistor 60 and into the base of transistor 71 is decreased. Therefore, the current flowing through winding 15 into the collector of transistor 71 is decreased with the result that the impedance of windings 13 and 14 is increased to minimize the assumed rise of load voltage.

What is claimed is:

1. In combination, a first and a second transistor each having a collector, an emitter and a base, one of said transistors being of the n-p-n type and the other of said transistors being of the p-n-p type, means for conductively connecting the collector of a first of said transistors to the base of a second of said transistors, a first current path comprising said conductive connection, the emitter-collector path of said first transistor and the emitter-base path of said second transistor, means for supplying current from a current source to said first current path, a load, means for connecting the collector of said second transistor to said load only, means for supplying current from said current source to a second current path comprising said load and the collector-emitter path of said second transistor, and means for supplying to the emitter-base path of said first transistor a current which may vary to control the current in said first current path and thereby to control the current supplied to said load.

2. In combination, a rectifier for rectifying current from an alternating-current supply source and for supplying the rectified current to a load circuit, a saturable reactor for controlling the current supplied from said source to said rectifier to thereby control the current supplied to said load circuit, said reactor having an impedance winding through which current from said source is supplied to said rectifier and a saturating winding to which current is supplied for controlling the impedance of said impedance winding, a transistor having a collector, an emitter and a base, a current path comprising said saturating winding connecting said collector to said load circuit, a second current path connected across said load comprising in series a resistor and a constant voltage device and having a first terminal which is common to said resistor and said constant voltage device, a resistance path connected across said load having a second terminal intermediate its end terminals, means for connecting said base to one of said first and second terminals, and means for connecting said emitter to the other of said first and second terminals.

3. In combination, a source of unidirectional voltage having positive and negative terminals, a transistor having a collector, an emitter and a base, means for impressing upon said base a potential intermediate said positive and negative terminals, a current path connecting said collector to one of said terminals, a current path connected to said terminals comprising a constant voltage device and a first resistor in series, and means comprising a second resistor connecting said emitter to the common terminal of said constant voltage device and said first resistor.

4. In combination, a first and a second transistor each having a collector, an emitter and a base, said first transistor being of a type requiring for operation a collector potential which is positive with respect to the potential of its emitter and said second transistor being of a type requiring for operation an emitter potential which is positive with respect to the potential of its collector, a source of unidirectional voltage having positive and negative terminals, a resistor in a current path connecting said positive terminal to the collector of said first transistor, a circuit connecting the emitter and base of said second transistor comprising said resistor and a conductor connecting the collector of said first transistor to the emitter of said second transistor, means for impressing upon the base of said second transistor a potential which is negative by a substantially fixed amount with respect to the potential of said positive terminal, a current path connecting the collector of said second transistor to said negative terminal, and means for impressing upon the base with respect to the emitter of said first transistor a potential for controlling the current in said current path.

5. In combination, a first, a second and a third transistor each having a collector, an emitter and a base, each of said first and second transistors being of a type which requires for operation a collector potential which is positive with respect to its emitter potential, said third transistor being of the type which requires for operation an emitter potential which is positive with respect to its collector potential, a unidirectional voltage source having positive and negative terminals, a resistor in a current path connecting said positive terminal to the collector of said first transistor, means for conductively connecting the collector of said second transistor to said positive terminal, means for impressing upon the base of said third transistor a potential which is negative by a substantially fixed amount with respect to the potential of said positive terminal, a circuit connecting said positive and negative terminals comprising in series said resistor, the base-emitter path of said second transistor and the emitter-collector path of said third transistor, and means for impressing upon the base with respect to the emitter of said first transistor a potential for controlling the current flowing out of said collector of said third transistor.

6. In combination, a first and a second transistor each having a collector, an emitter and a base, one of said transistors being of the n-p-n type and the other of said transistors being of the p-n-p type, means for conductively connecting the collector of a first of said transistors to the base of the second of said transistors, a first current path comprising said conductive connection and the collector and emitter junctions of said first transistor, a second current path comprising impedance and the collector and emitter junctions of said second transistor, means for supplying current to said current paths, and means for impressing upon the base with respect to the emitter of said first transistor a potential independent of voltage drop produced in said impedance for controlling the currents in said first and second current paths.

7. In combination, three transistors of the n-p-n and p-n-p types, the first and third of said transistors being of one of said types and the second transistor being of the other of said types, a first conductor connecting the collector of said first transistor to the base of said second transistor, a second conductor connecting the collector of said second transistor to the base of said third transistor, means for supplying current to a first current path comprising the collector-emitter path of said first transistor and in series therewith the emitter-base path of said second transistor, means for supplying current to a second current path comprising the collector-emitter path of said second transistor and in series therewith the emitter-base path of said third transistor, means for supplying current to a third current path comprising a load and in series therewith the collector-emitter path of said third transistor, a fourth current path comprising the emitter-base path of said first transistor, and means for supplying to said fourth current path current which may vary for controlling the current supplied to said load.

8. The combination with a source of unidirectional voltage which may vary and having positive and negative terminals, a reactor, means comprising said reactor for controlling the voltage of said source, a transistor having a collector, an emitter and a base, a first current path comprising said reactor connecting said collector to one of said terminals, a second current path connecting said emitter to the other of said terminals, and means for impressing upon said base with respect to said emitter a potential which varies in response to voltage changes of said source for controlling the current supplied to said reactor and thereby controlling the voltage of said source.

9. The combination with a source of unidirectional voltage which may vary and having positive and negative terminals, a magnetic amplifier having a control winding, means comprising said magnetic amplifier for controlling the voltage of said source in response to current supplied to said control winding, a transistor having a collector, an emitter and a base, a current path comprising said control winding connecting said collector to one of said terminals, means for connectnig said emitter to the other of said terminals, and means for impressing upon said base with respect to said emitter a potential which varies in response to voltage variations of said source to thereby control the current supplied to said control winding.

10. The combination comprising a plurality of transistors of the p-n-p and n-p-n types including a first and a last transistor, each transistor having a collector, an emitter and a base, means for connecting the base of each transistor of one of said types except the first to the collector of a preceding transistor of the other of said types, a direct voltage source having positive and negative terminals, a load, means for connecting the emitters of said transistors to said voltage source, a single current path comprising said load for connecting the collector of said last transistor to said voltage source, current being supplied from said source into the collector and out of the emitter of each n-p-n transistor and into the emitter and out of the collector of each p-n-p transistor, and means for impressing upon the base with respect to the emitter of said first transistor a potential for controlling the current supplied to said load.

11. The combination comprising a p-n-p type transistor and an n-p-n type transistor each having a collector, an emitter and a base, a direct-current supply source having a positive and a negative terminal, means for connecting the emitter of said n-p-n transistor to said negative terminal, means for connecting the emitter of said p-n-p transistor to said positive terminal, means for connecting the base of one of said transistors to the collector of the other of said transistors, a load, means for connecting the collector of one of said transistors only to one terminal of said load, means for connecting the other load terminal to the terminal of said source other than the terminal to which the emitter of said one transistor is connected, and means for impressing upon a circuit connecting the emitter and base of the other of said transistors a voltage for controlling the current supplied to said load.

12. The combination comprising a p-n-p type transistor and an n-p-n type transistor each having a collector, an emitter and a base, a direct-current supply source having a positive and a negative terminal, means for connecting the collector of said n-p-n transistor and the emitter of said p-n-p transistor to the positive terminal of said source comprising a conductor for connecting said collector and said emitter of said n-p-n and said p-n-p transistors respectively, means for connecting the emitter of said n-p-n transistor to the negative terminal of said source, a load, means comprising said load for connecting the collector of said p-n-p transistor to the negative of said source, a circuit connecting the base and emitter of said n-p-n transistor and means for impressing upon said circuit a voltage for controlling the current supplied to said load.

13. In combination, a first, a second and a fourth transistor each of the n-p-n type and a third transistor of the p-n-p type, such transistor having a collector, an emitter and a base, a first conductor connecting the collector of said first transistor and the base of said second transistor, a second conductor connecting the emitter of said second transistor and the emitter of said third transistor, a third conductor connecting the collector of said third transistor and the base of said fourth transistor, a direct-current supply source having a positive and a negative terminal, resistive means connecting said first conductor to said positive source terminal, means for connecting the collector of said second transistor to said positive source terminal, a first and a second constant voltage device, means for supplying current to each of said constant voltage devices to set up thereacross a substantially constant voltage, means comprising said first constant voltage device for connecting the emitter of said first transistor to the negative source terminal, means comprising said second constant voltage device for connecting the base of said third transistor to the positive source terminal, means for connecting the emitter of said fourth transistor to the negative source terminal, a load, means comprising said load connecting the collector of said fourth transistor to the positive load terminal, a circuit comprising said first constant voltage device connecting the emitter and base of said first transistor, and means for impressing upon said circuit in series with the voltage across said constant voltage device a voltage for controlling the current supplied to said load.

14. In combination, a first transistor of the n-p-n type and a second transistor of the p-n-p type each having a collector, an emitter and a base, a conductor for connecting the collector of said first transistor to the emitter of said second transistor, a direct-current supply source having positive and negative terminals, resistive means connecting said conductor to said positive terminal, means for maintaining the emitter of said first transistor at a substantially fixed positive potential with respect to said negative terminal, means for maintaining the base of said second transistor at a substantially fixed negative potential with respect to said positive terminal, a load, means comprising said load connecting the collector of said second transistor to said negative terminal, and means for impressing upon the base of said first transistor with respect to said negative terminal a potential for controlling the current supplied to said load.

15. In combination, a rectifier for rectifying current from an alternating-current supply source and for supplying the rectified current to a load circuit including a load, a saturable reactor for controlling the current supplied from said supply source to said rectifier to thereby control the current supplied to said load circuit, said reactor having an impedance winding through which current from said supply source is supplied to said rectifier, a transistor having a collector, an emitter and a base, a current path connected across said load comprising in series a resistor and a p-n junction rectifier poled so that current of a magnitude to exceed the Zener point flows through it in the inverse or high resistance direction, said p-n junction rectifier and said resistor having a first common terminal, a resistance path connected across said load having a second common terminal intermediate the end terminals of said resistance path, means for connecting said base to one of said first and second common terminals, means for connecting said emitter to the other of said first and second common terminals, means for supplying current to the collector of said transistor and means responsive to said collector current for controlling in part at least the impedance of said impedance winding.

16. In combination, a transistor of the p-n-p type, a transistor of the n-p-n type, each of said transistors having a collector, an emitter and a base, a source of direct voltage, means for supplying current from said direct voltage source through a circuit comprising the emitter-collector path of a first of said transistors and the base-emitter path of the second of said transistors in series, and means for controlling the voltage of said source comprising means for supplying current from said voltage source to the collector-emitter path of said second transistor and means for supplying current from said voltage source through the emitter-base path of said first transistor for controlling the current supplied through the collector-emitter path of said second transistor.

17. In combination, a transistor of the p-n-p type, a transistor of the n-p-n type, each of said transistors having a collector, an emitter and a base, a source of direct voltage, means for supplying current from said direct voltage source through a circuit comprising the emitter-collector path of a first of said transistors and the base-emitter path of the second of said transistors in series, means for supplying current from said voltage source to the collector-emitter path of said second transistor and means for supplying current from said voltage source through the emitter-base path of said first transistor for controlling the current through the emitter-collector path of said first transistor and the base-emitter path of said second transistor in series, thereby controlling the current through the collector-emitter path of said second transistor.

References Cited in the file of this patent

UNITED STATES PATENTS 2,503,880 Mah ---------------- Apr. 11, 1950

OTHER REFERENCES

Publication: Transistor Circuit Design, by Gordon Raisbeck, Electronics, December 1951.